United States Patent [19]

Ohmagari

[11] Patent Number: 4,755,773
[45] Date of Patent: Jul. 5, 1988

[54] PHASE MODULATOR APPARATUS FOR GENERATING A BURST PHASE-MODULATED WAVE

[75] Inventor: Shinichi Ohmagari, Tokyo, Japan

[73] Assignee: NEC Corporation, Japan

[21] Appl. No.: 55,432

[22] Filed: May 28, 1987

[30] Foreign Application Priority Data

May 29, 1986 [JP] Japan .............................. 61-122287

[51] Int. Cl.⁴ ...................... H04L 27/20; H03C 1/06
[52] U.S. Cl. .................................... 332/9 R; 332/10;
370/12; 370/58; 375/57; 375/60; 375/71; 375/9
[58] Field of Search ............... 332/9 R, 9 T, 10, 16 R,
332/16 T; 370/12, 53, 58, 77, 104; 375/52, 57,
58, 60, 67, 68, 71, 9

[56] References Cited

U.S. PATENT DOCUMENTS 4,483,000 11/1984 Yamamoto et al. ................. 370/95
4,485,478 11/1984 Takada ................................. 375/60
4,706,262 11/1987 Ohta ..................................... 375/60

*Primary Examiner*—Siegfried H. Grimm
*Attorney, Agent, or Firm*—Laff, Whitesel, Conte & Saret

[57] ABSTRACT

A time division communication system tends to develop noise responsive to variations of the output of the voltage supply which occur as the time slot signals switch on or off to thereby vary the load demand placed upon the power supply. The invention eliminates these voltage variations by providing a second and complementarily acting switch which applies a load across the power supply when the load of the time slot signals is removed. This way, the total load across the power supply remains generally unvarying.

10 Claims, 3 Drawing Sheets

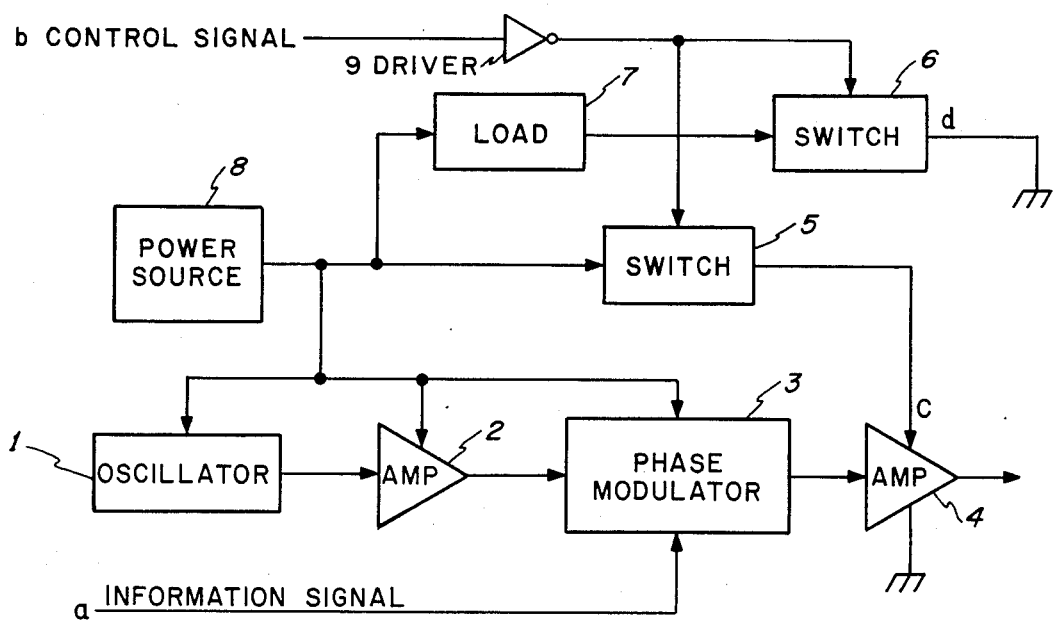
FIG. 1
FIG. 2A   SIGNAL a
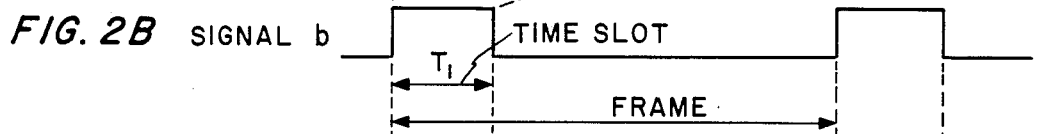
FIG. 2B   SIGNAL b
FIG. 2C   SIGNAL c
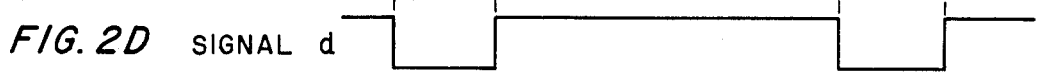
FIG. 2D   SIGNAL d
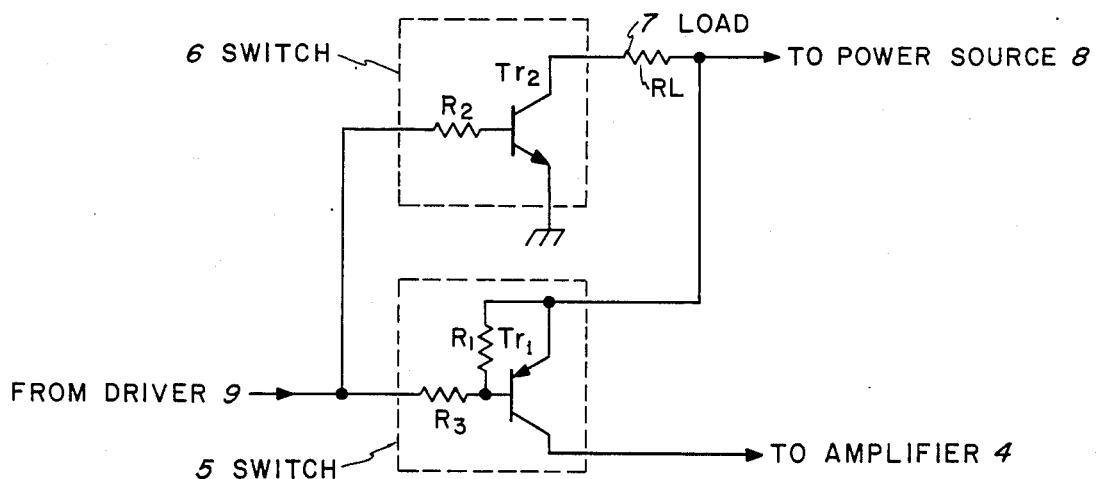
FIG. 3

4,755,773

PHASE MODULATOR APPARATUS FOR GENERATING A BURST PHASE-MODULATED WAVE

BACKGROUND OF THE INVENTION

The present invention relates to a phase modulator apparatus, and more particularly to a phase modulator apparatus for generating a burst phase-modulated wave, which is used in a burst signal communication system such as a TDMA (Time Division Multiple Access) communication system and an MD-TDM (Multi Directional-Time Division Multiplex) communication system.

A conventional phase modulator apparatus of this kind includes a carrier generator for generating a carrier wave, a phase modulator for phase-modulating the carrier wave with an input information signal, an amplifier for amplifying the output of this phase modulator, a power source for supplying a source voltage to the oscillator, and the phase modulator and the amplifier. A switch turns on and off the source voltage supplied to the amplifier in a time-division burst mode. This switch provides a phase-modulated burst wave from the output of the amplifier.

In such an apparatus, when the source voltage is turned on or off in a time-division burst mode, the current supplied from the power source varies, thereby giving rise to fluctuations in voltage drop due to minute resistances which are present on the power supply line. As a result, the carrier frequency of the oscillator is varied to adversely affect the modulating performance.

SUMMARY OF THE INVENTION

An object of the invention, therefore, is to provide a phase modulator apparatus which is capable of eliminating the frequency variations of the oscillator which are caused by fluctuations in power source voltage during the burst mode operation.

A phase modulator apparatus for generating a burst phase-modulated wave according to the invention comprises a carrier generator for generating a carrier wave, a phase modulator for phase-modulating the carrier wave with an input information signal, an amplifier for amplifying the output of the phase modulator, and a power source for commonly supplying a source voltage to the carrier generator, the phase modulator and the amplifier. A first switch is responsive to a burst control signal for controlling the supply of the source voltage to the amplifier, and a load coupled to the power source. A second switch, connected to the load in series, is responsive to the burst control signal, for operating in a manner which is mutually complementary to the first switch.

BRIEF DESCRIPTION OF THE DRAWINGS

FIGS. 2A to 2D constitute a time chart for explaining the operation of the phase modulator apparatus of FIG. 1;

FIG. 3 illustrates a specific example of circuitry for the switches in the embodiment of FIG. 1.

DESCRIPTION OF THE PREFERRED EMBODIMENT

Figure 1A:
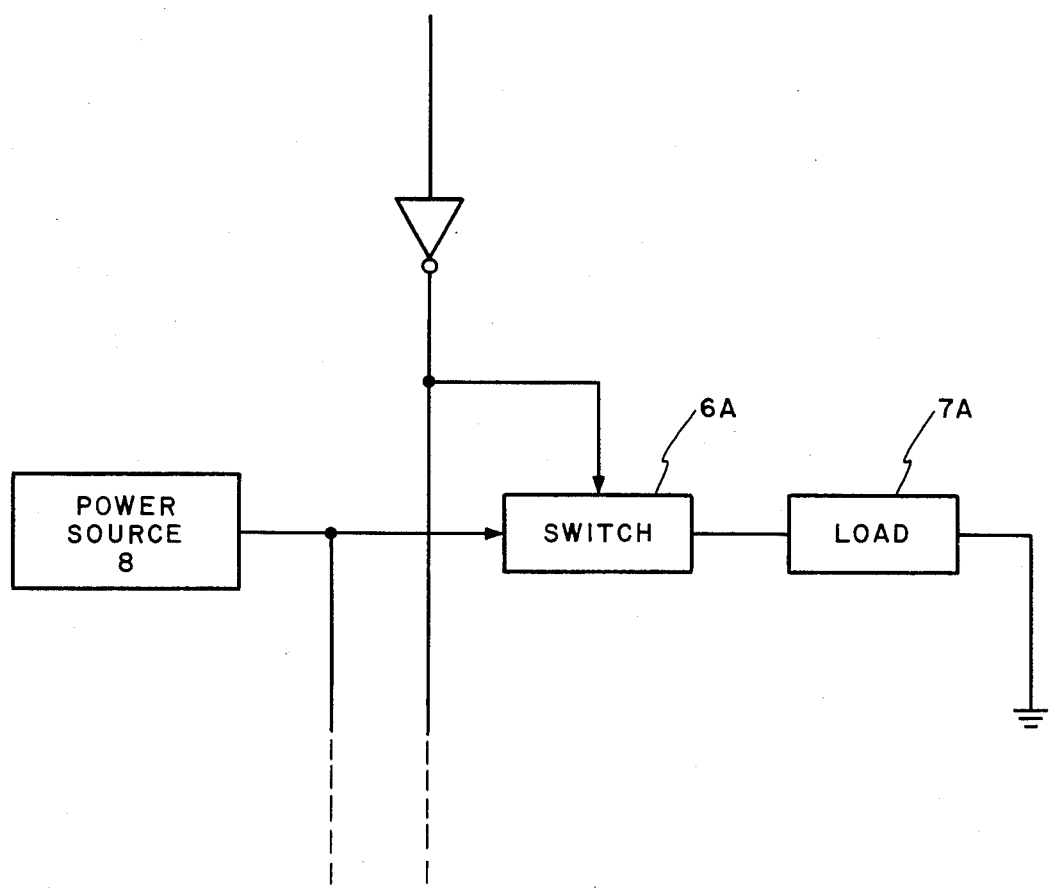
FIG. 1 is a block diagram illustrating the structure of a phase modulator apparatus embodying the present invention (FIG. 1A is the same as FIG. 1 except that the load has been moved from the input to the output of a switch)

FIG. 1 shows a phase modulator apparatus of the present invention, reference numeral 1 identifies a carrier oscillator or generator for generating a carrier wave; 2 and 4, amplifiers; 3, a phase modulator; 5 and 6, switches; 7, a dummy load; 8, a common power source; and 9, a driver.

Now, the operation of this phase modulator apparatus will be described by referring to FIGS. 2A to 2D which show waveforms at various points in the apparatus of FIG. 1.

The carrier wave from the oscillator or generator 1 is amplified by the amplifier 2 and supplied to the phase modulator 3, which phase-modulates the amplified carrier wave with an information signal, i.e., a digitized speech signal a shown in FIG. 2A. The phase-modulated carrier wave is amplified by the amplifier 4, which is selectively actuated by the switch 5. The switch 5 selectively supplies a current c (FIG. 2C) from the power source 8 to the amplifier 4 in response to a burst control signal b, which is (FIG. 2B) polarity-inverted by the driver 9.

The burst control signal b has, as shown in FIG. 2B, a time slot $T_1$, which is allocated for one station and which is also repeated once every one frame. The frame includes other time slots (not shown) which identify other stations.

Thus, the apparatus of each station, i.e., the amplifier 4, provides an appropriate burst phase-modulated carrier wave.

The switch 6 featuring the present invention is connected in parallel with the switch 5 and operates in a manner that is complementary to the operation of switch 5. That is, upon the turning on and off of the switch 5, the switch 6 is turned off and on, respectively. When the switch 6 is turned on, the current d shown in FIG. 2D flows through the load 7 and the switch 6 to ground. If the resistance of the load 7 is adjusted so that the current d flowing through the switch 6 becomes equal to the current c flowing through the switch 5, the output voltage of the power source 8 does not vary despite the turning-on/off of the switch 5. Therefore, the oscillation frequency of the carrier oscillator or generator 1 remains unaffected.

The load 7A (FIG. 1A) may be provided between the output of the switch 6A and a potential point which is the ground. Otherwise, the circuit of FIG. 1A is the same as FIG. 1.

A specific example of circuitry for the switches 5 and 6 is shown in FIG. 3. According to this example, the switch 5 consists of a PNP type transistor $Tr_1$, a resistor $R_1$ connected between the base and the emitter of transistor $Tr_1$; and a resistor $R_3$ connected between the base terminal and the switch input from driver 9. The switch 6 consists of an NPN type transistor $Tr_2$ and a resistor $R_2$ connected between the base and the switch input from driver 9. The collector of the transistor $Tr_1$ is connected to the amplifier 4 (FIG. 1) and its emitter is connected to the power source 8 (FIG. 1). The collector of the transistor $Tr_2$ is connected to the power source 8 via a resistor $R_L$, which is the load 7. Its emitter is grounded. These transistors $Tr_1$ and $Tr_2$; implement the complementary ON/OFF-operations in response to the drive control signal which is the output of the driver 9.

Figure 4:
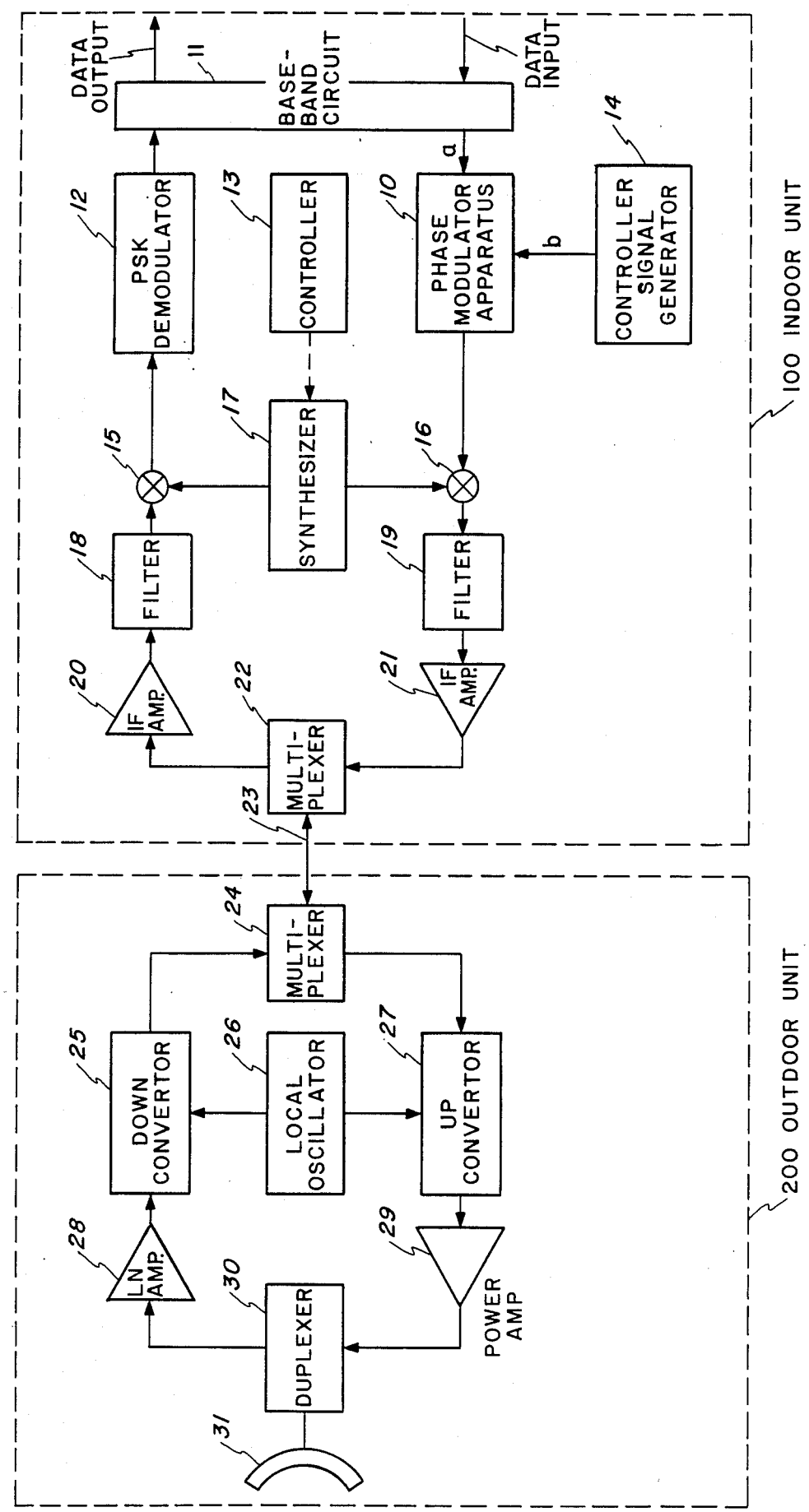
FIG. 4 is a block diagram illustrating an example of a transmitter-receiver using the phase modulator apparatus according to the invention.

FIG. 4 is a block diagram showing an example of a transmitter-receiver for use in a TDMA satellite communication system, to which the present invention is applied.

As illustrated, this transmitter-receiver includes an indoor unit 100 and an outdoor unit 200. A phase modulator apparatus 10 according to the invention, is used in the indoor unit 100. Apparatus 10 includes a phase shift-keyed (PSK) phase modulator, 10 for instance, and supplies a burst phase-modulated signal, as described above, phase modulator apparatus 10 operates in response to an information signal a from a baseband circut 11 and a burst control signal b from a control signal generator 14. This burst phase-modulated signal is mixed by a mixer 16 with an output from a synthesizer 17, filtered by a filter 19, amplifier by an intermediate frequency (IF) amplifier 21, and supplied to a multiplexer 24 of the outdoor unit 200 by way of a multiplexer 22 and a single cable line 23.

In the outdoor unit 200, the output signal from a multiplexer 24 is frequency converted into the radio frequency (RF) band in response to a local oscillator 26 and an up converter 27. After being amplified by a power amplifier 29, the resulting signal is transmitted by way of a duplexer 30 and an antenna 31 to a satellite. Meanwhile, a signal from the satellite is received by the antenna 31 of the outdoor unit 200. After going through the duplexer 30 and a low noise (LN) amplifier 28, the received signal is frequency converted in response to the local oscillator 26 and a down converter 25. The converted receive signal is entered into the multiplexer 22 of the indoor unit 100 via the multiplexer 24 and the cable line 23. The output from the multiplexer 22 goes through an IF amplifier 20 and a filter 18, and then is mixed by a mixer 15 with an output from the synthesizer 17. After the mixed signal is demodulated by a PSK demodulator 12, it is supplied to the baseband circuit 11. Herein, a controller 13 controls the frequencies of the synthesizer 17.

In summary, according to the present invention, a first switch selectively actuates the amplifier connected to the output of the phase modulator. A second switch operates in a relationship which is complementary to the first switch to supply a current to a dummy load which is connected in series with this second switch. The resistance of the dummy load is selected so that the currents flowing through the first and second switches become equal to each other. As a result, the current flowing from the power source is kept constant to make it possible to eliminate the frequency variations of the carrier generator which are attributable to source voltage fluctuations during burst mode operation.

What is claimed is:

1. A phase modulator apparatus for generating a burst phase-modulated wave in response to an information signal and a burst control signal, said apparatus comprising:
   carrier generator means for generating a carrier wave,
   phase modulator means for phase-modulating said carrier wave with said information signal,
   amplifier means for amplifying the output of said phase modulator means,
   power source means for commonly supplying a source voltage to said carrier generator means, said phase modulator means, and said amplifier means,
   first switch means responsive to said burst control signal for controlling the supply of said source voltage to said amplifier means,
   load means coupled to said power source means, and
   second switch means connected in series with said load means, said second switch means operating in response to said burst control signal and in a manner mutually complementary to said first switch means.

2. A phase modulator apparatus as claimed in claim 1, wherein said loan means is a resistor.

3. A phase modulator apparatus as claimed in claim 1, wherein said load means has a resistance such that currents flowing through said first switch means and said second switch means become equal to each other.

4. A phase modulator apparatus for generating a burst phase-modulated wave, as claimed in claim 1, wherein said load means is connected between the output of said power source means and the input of said second switch means.

5. A phase modulator apparatus as claimed in claim 1, wherein said load means is connected between the output of said second switch means and a potential point.

6. A time division communication system comprising a power supply means, first switching means energized from said power supply for cyclically switching on and off in order to generate sequentially recurring time slot signals whereby demands for power from said power supply increase abruptly during said time slot signals and decrease abruptly during periods between said time slot signals, second switching means energized from said power supply and operated in a time complementary manner with respect to said first switching means whereby only a single one of said two switching means is operated at any given time and either one or the other of said switching means is operated at all times, and load means simulating the power demand of said time slot signals coupled to said power supply responsive to the operation of said second switching means, whereby said time slot signals and said load means present a substantially constant load to said power supply.

7. The system of claim 6 and phase modulating means for generating burst phase-modulated signals by turning on and off an application of said source voltage to an amplifier in a time division burst mode.

8. The system of claim 7 wherein said phase modulating means is part of a land based system, means for transmitting/receiving signals between said land based system and a satellite system, a single communication wire coupled between said based system and said transmitting/receiving means, and multiplexing means coupled to opposite ends of said single communication wire for transmitting two way signals between said transmitting/receiving means and said land based system, said phase modulating means having an output coupled to the multiplexing means coupled to the land based end of said single communication wire.

9. The system of claim 6 wherein said power supply means, said first and second switching means, and said load means are parts of a phase modulator means, said phase modulator means further comprising a carrier frequency oscillator coupled to said phase modulator means, said first switching means being coupled to effectively turn on said phase modulator means during said time slots and to effectively turn off said phase modulator means during periods between said time slots, whereby said carrier frequency is phase modulated and transmitted during said time slots.

10. The system of claim 9 and amplifier means coupled to the output of said phase modulator means, said first switching means being coupled to switch said amplifier on and off for accomplishing said effective switching on/off of said phase modulator.

* * * * *